Aug. 4, 1964   G. F. KOHLER ETAL   3,143,702
SHAKE TABLE TESTING APPARATUS AND ASSOCIATED ELECTRICAL
SYSTEM FOR TESTING THE ELECTRICAL CHARACTERISTICS
OF CIRCUIT BOARDS, LOGIC CARDS, AND THE LIKE
Filed June 27, 1960                                      4 Sheets-Sheet 1

INVENTORS
LANE L. WOLMAN
GEORGE F. KOHLER
EDMUND D. REGAN
BY
ATTORNEY

Aug. 4, 1964
G. F. KOHLER ETAL 3,143,702
SHAKE TABLE TESTING APPARATUS AND ASSOCIATED ELECTRICAL
SYSTEM FOR TESTING THE ELECTRICAL CHARACTERISTICS
OF CIRCUIT BOARDS, LOGIC CARDS, AND THE LIKE
Filed June 27, 1960
4 Sheets-Sheet 2
FIG. 3     SHEFFER-STROKE GATE INPUT CIRCUIT
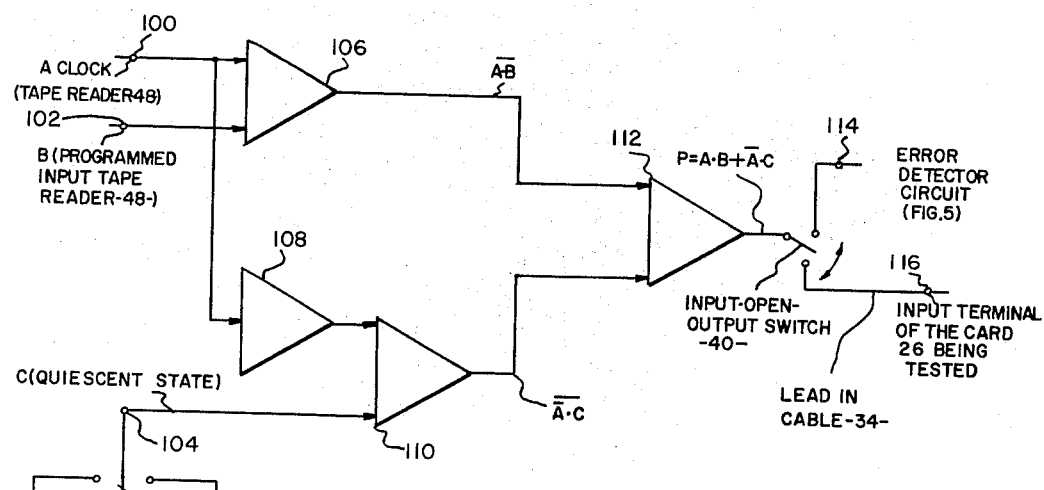
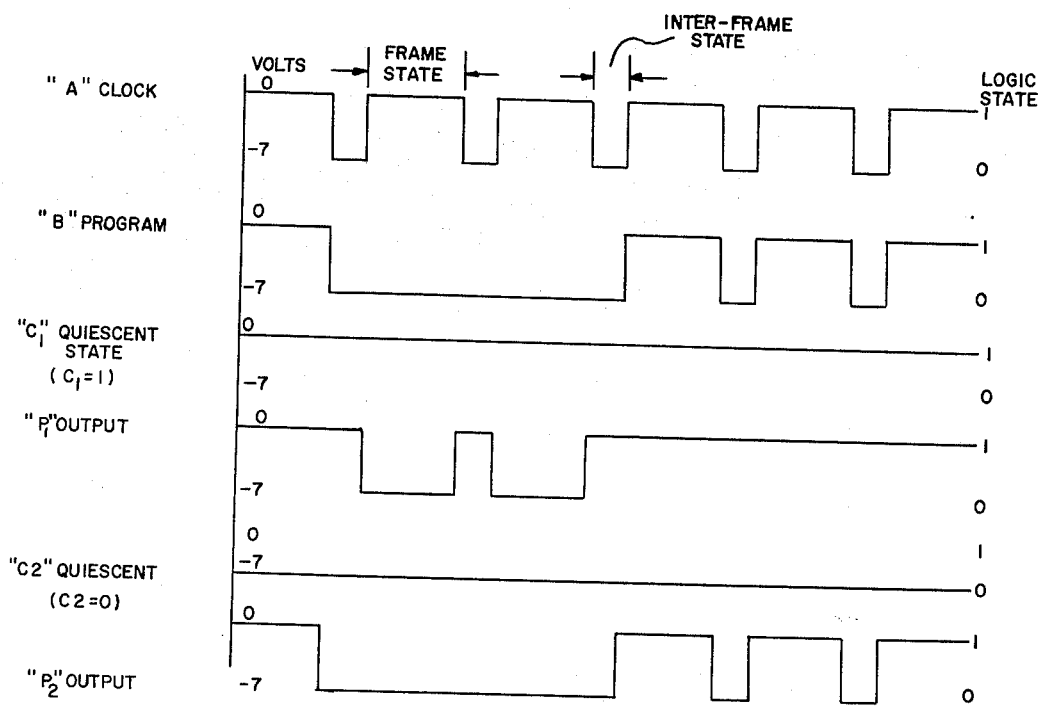

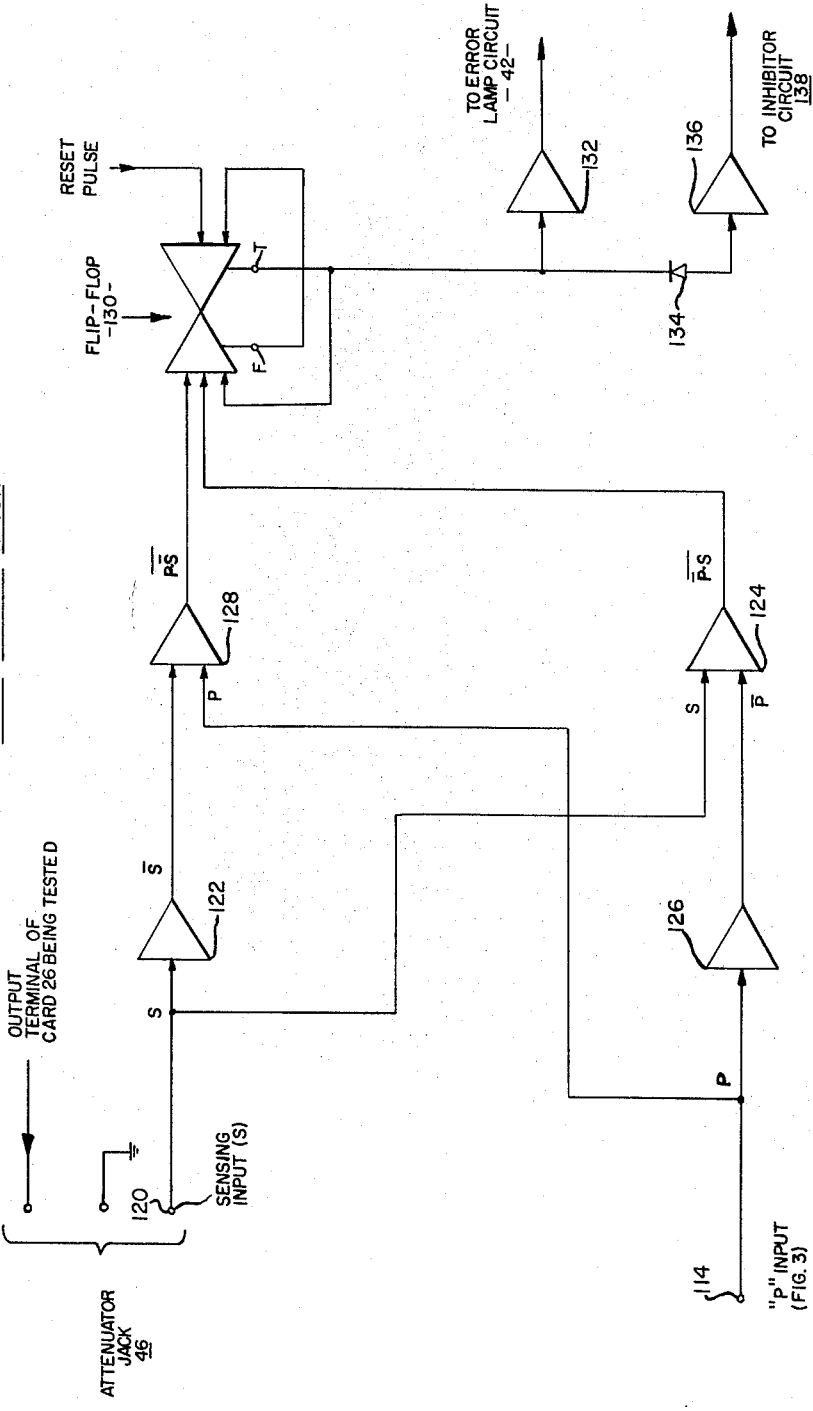

3,143,702
SHAKE TABLE TESTING APPARATUS AND ASSOCIATED ELECTRICAL SYSTEM FOR TESTING THE ELECTRICAL CHARACTERISTICS OF CIRCUIT BOARDS, LOGIC CARDS, AND THE LIKE
George F. Kohler, Burbank, Edmund D. Regan, Hollywood, and Lane L. Wolman, North Hollywood, Calif., assignors to General Precision, Inc., a corporation of Delaware
Filed June 27, 1960, Ser. No. 38,900
7 Claims. (Cl. 324—73)

The present invention relates to an improved instrument for completely testing assembled circuit boards, such as logic cards, and the like.

The testing unit of the invention to be described is a circuit board tester in which fully assembled circuit boards, or logic cards, are tested while being subjected to a violent shaking action in a shake table fixture. The shake table fixture operates, for example, at 30 cycles per second, and it exerts accelerations of the order of 3 G's on the card being tested.

The system and apparatus of the present invention is so conceived that the output signals from the logic card being tested experience the same load conditions which will be encountered in the actual working environment in which the card is to be placed. The testing unit is equipped to test the logic circuitry on the individual cards under the normal logic sequence for each of the cards. Moreover, the tester of the invention, by the use of plug-in attenuating and bias circuitry, can test the values of the components supported on the cards at their operating limits.

In the embodiment of the invention to be described, a punched tape, properly programmed to the particular logic card being tested, is used to apply the test signals to the input terminals of that card. These signals may be applied, for example, at the rate of 500 bits of information per second. Any errors or malfunctioning in the circuitry or components supported on the particular logic card being tested, or any out-of-limits values of the components, as a result of the applied signals, are indicated by the lighting of one or more indicator lamps which are located on the front panel of a rack-and-panel portion of the tester. Then, by noting which lamp or lamps are illuminated, and by noting which test pattern on the tape caused that particular lamp to be illuminated, the operator can determine which element or stage of the card being tested is faulty.

The tester assembly to be described includes a shake table fixture, as noted above, and it also includes the above mentioned rack-and-panel assembly. The shake table fixture incorporates a vertically disposed bracket, for example, which is capable of supporting the particular circuit board being tested. The bracket is mounted for vertical reciprocal movement and it may be actuated by a suitable motor driven crank mechanism.

The rack-and-panel assembly of the embodiment of the invention to be described, supports, for example, a punched paper tape reader; a bank of neon error-indicating lamps; a corresponding bank of 3-position lever switches which may be switched to "input," "open" or "output" positions depending upon the particular program involved; and a corresponding bank of quiescent-state toggle switches. The rack-and-panel assembly also supports a corresponding plurality of attenuator jacks for receiving respective attenuator or load circuit plug-in units. Each of the neon lamps, switches, and jacks is used in conjunction with a corresponding terminal of the circuit board being tested. The input-open-output lever switches determine whether the circuitry associated with each group of jacks, switches, and neon lamps is to be connected to a corresponding input terminal of the logic card being tested, to a corresponding output terminal of that card, or disconnected from the circuit.

Before a particular circuit board is tested, a test program is prepared. This program consists in determining the successive patterns of signals to be applied to the various input terminals of the logic card to produce the desired outputs from the corresponding output terminals. A punched paper tape is then prepared which causes the signals to be applied to the input terminals of the logic card being tested in the various combinations, and in accordance with the established program.

In operation the operator inserts the appropriate attenuator units into the corresponding jacks, and actuates the quiescent-state toggle switches and the 3-position lever switches. The prepared punched paper tape is then placed in the tape reader, and the shake table fixture is activated. Then, if there is any error in the circuitry of the particular circuit board being tested, or malfunctioning of a component on the board, the corresponding neon lamp is illuminated to indicate such an error or malfunction.

The punched paper tape is read by the tape reader, and this causes various combinations of signals to be applied to the circuitry of the logic card being tested. These combinations may be applied, for example, at the rate of six combinations a second. Should an error-indicating lamp become energized during these operations, the tape is immediately stopped so that the input combination which produced the energizing of the lamp may be identified.

An important purpose of the testing unit of the present invention is to test the logic-level output of all the different types of logic cards used in a typical computer, or in any other electronic system. The logic card undergoing the test is programmed by a punched paper tape, as mentioned above. There may be twenty-eight input-output 3-position lever switches in a particular installation, for example, to introduce corresponding input signals to the logic card or to corresponding error-detector circuits. There also may be twenty-eight quiescent-state toggle switches provided to pre-select quiescent-state signals for introduction to selected input terminals of the card, for reasons to be described. A selector switch and a meter may be mounted on the rack-and-panel assembly to indicate and monitor the operating voltages.

A plurality of error-detector circuits is used to indicate when there is an improperly operating circuit or malfunctioning component on the logic card being tested, and also to indicate the particular output terminal at which such malfunctioning appears. The input signal combination producing the malfunctioning condition is determined in the manner described above. A separate neon indicator lamp is connected to each error-detector circuit, and is illuminated whenever the corresponding error-detector circuit is connected to a corresponding output terminal of the card by the actuation of the corresponding 3-position input-open-output lever switch, and when an error is indicated at that output terminal.

Load resistances and attenuators may be plugged into the attenuator jacks on the rack-and-panel assembly, as mentioned above, so as to simulate load conditions for the output terminals of the logic card while the logic card is undergoing test, and so as to simulate appropriate operating conditions for the error-detector circuits.

The tester assembly and system described above is capable of testing, for example, the many different types of general-purpose computer logic cards. The equipment is also capable of testing, for example, the different types of magnetic file drum and computer buffer logic cards.

An important object of the present invention, therefore, is to provide a relatively simple and relatively easy-to-operate tester for circuit boards, such as logic cards, or the like. The tester of the invention operates in an improved manner to subject the circuit board under test to a violent shaking action, in excess of any vibration it will encounter in common usage, and at the same time introduces successive programmed patterns of input signals to the card to determine, by appropriate error-detector circuits, whether all the components and circuitry on that particular circuit board are operating properly.

A feature of the invention resides in its extreme flexibility which enables it to be used in conjunction with a wide variety of different circuit types of logic cards. Input or output circuitry can be selectively connected to any terminal of a card merely by a simple switching action, appropriate load and bias conditions can quickly be established by plug-in units in the embodiment to be described, and programmed patterns of input signals can be introduced to the card in the embodiment to be described by the reading of a specially prepared tape corresponding to the particular card being tested.

Reference is now made to the accompanying drawings as illustrative of a particular embodiment of the invention.

In the drawings:

FIGURE 3 is a schematic representation of a gate circuit, a plurality of which is used in the system and equipment of the invention to selectively introduce input signals to the various input terminals of the card being tested;

FIGURE 4 is a series of curves which are useful in explaining the operation of the circuitry of FIGURE 3;

FIGURE 5 is a schematic representation of an error-detector circuit, a plurality of which is used for controlling the individual error lamps supported on the panel assembly of FIGURE 1;

Figure 2:
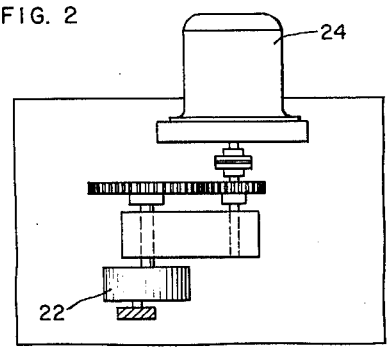
FIGURE 2 is a plan view of the shake table fixture assembly of FIGURE 1, showing that assembly from the top, so as to illustrate the drive motor and other drive components for the shake table assembly.
Figure 1:
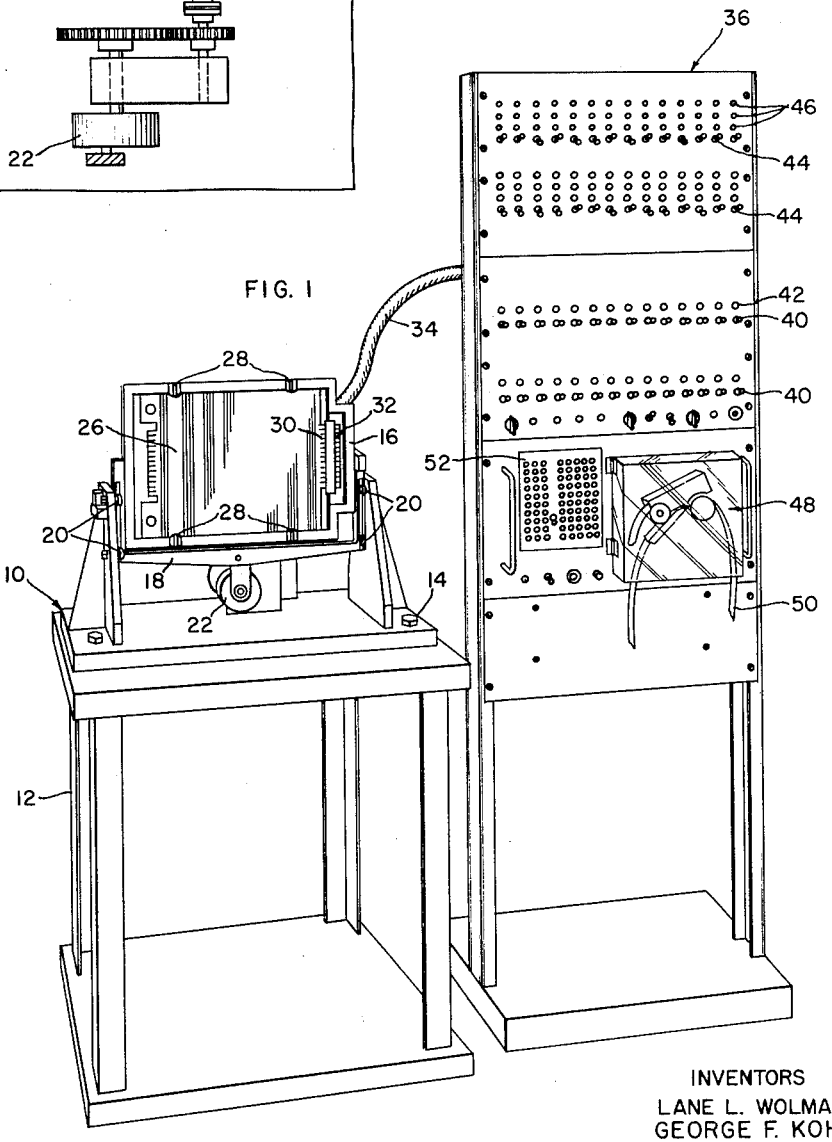
FIGURE 1 is a perspective view of equipment constructed in accordance with one embodiment of the invention, this equipment including a shake table fixture assembly and a rack-and-panel assembly connected to the shake table fixture by an appropriate multi-wire cable.

The assembly of FIGURES 1 and 2 includes a shake table fixture 10. This fixture is supported on an appropriate mounting pedestal 12, and it includes a supporting base 14 which is mounted on the pedestal. A vertically disposed card-supporting frame 16 is supported in a vertical bracket 18, which, in turn, is supported on a base 14 by a plurality of bearings 20 for reciprocal motion with respect to the base. A suitable crank mechanism 22 is eccentrically coupled to the bracket 18. The crank mechanism imparts the desired vertical reciprocal motion to the frame 16 and to the bracket 18 as the crank mechanism is rotated. A motor 24 provides the desired rotational motion for the crank mechanism 22. A logic card 26 is supported in the frame 16, so that the circuitry and components supported on the logic card may be tested. The logic card is releasably supported in the frame 16 by means, for example, of a plurality of fasteners 28.

The logic card 26 may have, for example, a plurality of terminals 30 at one end, and these terminals extend into an appropriate receptacle 32 which is supported on the frame 16. The receptacle 32 includes a corresponding plurality of electrical contacts which engage respective ones of the terminals 30 of the logic card 26. A multi-wire cable 34 is connected to the contacts of the receptacle 32, and this cable extends to control circuitry which is supported on a rack-and-panel assembly 36.

It will be understood that the input and output terminals of the logic card 26 have connections made to them from the individual wires in the cable 34 by means of the contacts of the receptacle 32. It will also be understood that for the different logic cards to be tested, the input and output terminals will be represented by different ones of the connections established to the cable 34. As will be described, the equipment of the present invention is controllable for the different logic cards, so that a plurality of input circuits may be selectively connected to different ones of the terminals of the card being tested to enable connections to be made to the input terminals of that particular card. Likewise, the rack-and-panel assembly 36 includes a plurality of error-detector circuits, and these may be selectively connected to the terminals of the particular card representing the output terminals of that card.

In general, the rack-and-panel assembly includes a plurality of input circuits and a corresponding plurality of error-detector circuits. These input and error-detector circuits may be selectively connected to corresponding ones of the terminals of the logic card being tested. The selections are made so that input circuits are connected to the input terminals of the particular card being tested, and error-detector circuits are connected to the output terminals of that card. In the embodiment to be described, these selections are made by the plug-in units and the input-open-output three-position lever switches on the rack-and-panel assembly. However, automatic means, such as a punched paper tape, can be used for effecting the proper selections for the different types of cards which may be tested.

When the motor 24 is energized, the shake table fixture 10 is capable of subjecting the logic card 36 to a vertical shaking action, as described above. As also mentioned, a typical operation may be carried out at 30 cycles per second and at approximately 3 G's. The object of the equipment, as noted above, is to test the electrical characteristics of the circuitry and components supported on the logic card 26, while the logic card is being subjected to this violent shaking action.

Assuming that the logic cards to be tested include twenty-eight terminals, some of which may be input terminals and some of which may be output terminals, the rack-and-panel assembly 36 supports a corresponding number of input circuits and a corresponding number of error-detector circuits. In this manner, a particular input circuit or a particular error-detector circuit is provided for each terminal of the logic card being tested. Likewise, the front panel of the assembly has a corresponding plurality of lever switches 40 mounted on it. These lever switches are of the 3-position type, as noted above. They are termed the input-open-output lever switches, and they serve to selectively connect the respectively associated input circuits to the particular terminals of the card being tested which serve as input terminals for that particular card, and to connect the respectively associated error-detector circuits to the particular terminals of the card being tested which serve as output terminals for that card. A corresponding plurality of output indicator lamps 42 are mounted on the panel of the assembly 36. These indicator lamps are mounted respectively adjacent corresponding ones of the lever switches 40 and are connected to respective ones of the error-detector circuits. Any particular indicator lamp 42 is effective only when its corresponding error-detector circuit is connected to an output terminal of the logic card 26 being tested.

When an indicator lamp 42 glows, it indicates an error in the circuit connected to its particular output terminal. Then, and as will be described in more detail subsequently, the input operation is immediately stopped so that the voltage input combination producing that error can be identified in order to determine the malfunctioning circuit or component.

A plurality of toggle switches 44 is also mounted on the front panel 36. These toggle switches, as noted above, are termed "quiescent state" toggle switches. Any particular one of the toggle switches 44 is capable of controlling the operation of the corresponding input circuit so that a voltage representative of either a "1" state (−7 volts) or a "0" state (ground) is introduced to the particular input terminal during the inter-frame state (FIGURE 4). The function of the clock signal of curve (A) in FIGURE 4 is solely to divide the test cycle into two states a "frame" state and an "inter-frame" state. During the "frame" state, the tape reader program of curve (B) solely determines the signal that is applied to the particular input terminal. This feature provides a flexibility in the testing capabilities of the equipment, in that, during the "frame" state, programmed inputs may be used for testing gate circuits on the logic card 26, for example, and during the "inter-frame" state it is possible by introducing "1's" to particular flip-flop inputs on the logic card, to prepare such flip-flops for their test which occurs during the next succeeding "frame" state.

Figure 6:
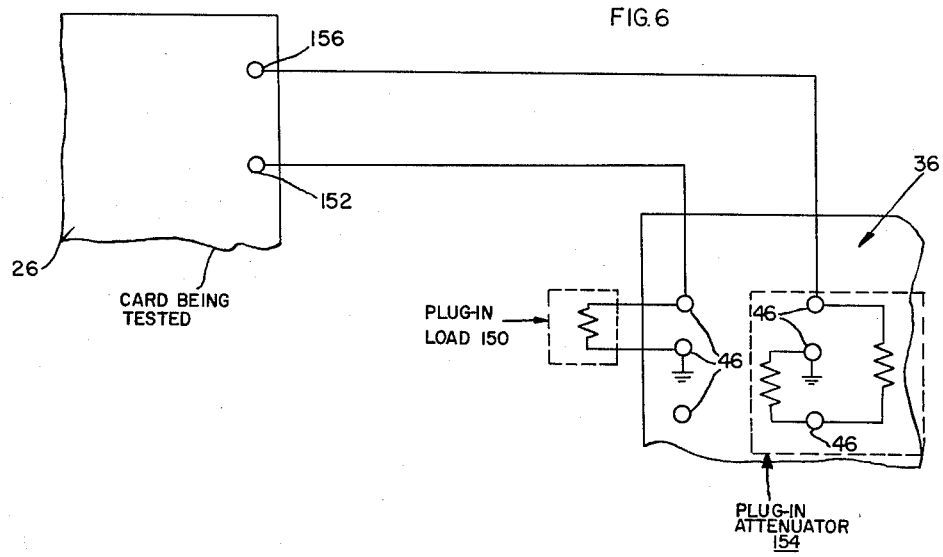
FIGURE 6 is a fragmentary representation of the circuitry represented by different types of plug-in units used in the system of the invention.

A plurality of 3-terminal jacks 46 are provided on the panel of the rack-and-panel assembly 36 adjacent corresponding ones of the toggle switches 44. These latter jacks are adapted to receive plug-in attenuators or plug-in loads, as shown in FIGURE 6. A plug-in attenuator may be plugged into a jack 46 to be connected to one of the error-detector circuits when that particular circuit is being used due to a setting of the associated lever switch to the "output" position. Alternately, a plug-in load may be plugged into one of the jacks 46 to apply a selected load to a particular output terminal of the logic card 26.

A paper tape reader 48 is also mounted on the panel of the assembly 36. This paper tape reader may be of any appropriate type. For example, it may be of the type provided by the California Technical Industries of Belmont, California, and designated by them as their "Tape-Ard Reader" Model 171A. The inputs to the logic card 26 are programmed on a punched paper tape 50 which is passed through the paper tape reader 48. This tape 50 is pre-programmed to provide the appropriate patterns of inputs to all logic cards of a particular type, such as, for example, the logic card 26. A bank of glow lamps 52 serve as a monitor for the signals read from the punched paper tape 50 by the tape reader 48.

In the operation of the apparatus and system of FIGURES 1 and 2, the logic card 26 to be tested is placed in the shake table fixture 10, and the punched paper tape 50 bearing the program corresponding to that particular card is placed in the paper tape reader 48. The input-open-output lever switches 40 are then set so that selected ones of the above mentioned circuits supported on the rack-and-panel assembly 36 are respectively connected to the corresponding input terminals of the logic card 26; and selected ones of the above mentioned error-detector circuits supported on the assembly are respectively connected to the output terminals of the card.

The "quiescent-state" toggle switches 44 are then set so that either a "1" or a "0" may be introduced to the particular input terminal of the card 26 during the inter-frame period for the reasons stated. The appropriate load and attenuator plug-in units are plugged into the jacks 46. Special short-circuiting plugs may be inserted into the jacks 46 for testing transistors on the logic card 26 in their saturated condition.

A frame-change switch on the tape reader is then depressed to establish the punched paper tape 50 at the first frame. Then, if all the output indicator lamps 42 are deenergized, the second frame test is ready to begin. If, on the other hand, any of the output indicator lamps 42 are illuminated, the corresponding output terminal number is recorded, together with the frame number of the punched paper tape. In this manner, the tape is run through the tape reader 48 from frame to frame, and the procedure is repeated from one logic card to the next until one of the indicator lamps 42 is illuminated. As mentioned above, when an indicator lamp 42 glows, the punched paper tape 50 is immediately stopped so that the frame which produce the illumination may be discovered. That frame is noted, together with the output terminal corresponding to the illuminated indicator lamp 42, and from that information the particular logic card circuit or component which is malfunctioning can be easily determined.

The circuitry of FIGURE 3 represents one of the plurality of input circuits which is supported on the rack-and-panel assembly 36. As mentioned above, the number of input circuits corresponds to the number of terminals of the logic cards 26. Then, an appropriate number of input circuits can be selected by appropriate adjustments of the lever switches 40 to be respectively connected to the input terminals of the particular card being tested.

The circuit of FIGURE 3 is essentially a combination of sheffer-stroke gates. The fundamental propositional statement of this type of circuit is that the output "C" is "zero" only if both the input "A" and the input "B" are a "one." Gates of this type are described, for example, in an article by W. D. Rowe, entitled "The Transistor NOR Circuit," 1957, I.R.E. Wescon convention record, Part 4, pages 231–245. However, in the present case, the gates are operated with a reversal of the polarities assigned to the values "1" and "0."

The input circuit of FIGURE 3 includes an input terminal 100 which is connected to one of the output terminals of the tape reader 48 of FIGURE 1 to receive the clock pulses "A" read from the tape 50 by the tape reader. The circuit of FIGURE 3 also includes an input terminal 102 which is connected to another output terminal of the tape reader 48. The latter output terminal of the tape reader applies programmed information "B" to the circuit of FIGURE 3, and each of the different input circuits is connected to a different output terminal of the paper-tape reader. In this manner, the paper tape reader feeds successive signal combinations to the different input circuits, as determined by the program on the particular tape 50 fed through the reader.

One of the "quiescent state" switches 44 has its arm connected to a third input terminal 104 of the input circuit of FIGURE 3. The "quiescent state" toggle switch 44 has a first fixed contact connected to the negative terminal of a 7-volt direct voltage source, and it has a second fixed contact which is grounded.

The terminals 100 and 102 are connected to a gate 106, and the terminal 100 is connected through an inverter 108 to a gate 110. These gates, and others to be referred to subsequently, are of the sheffer-stroke type referred to above.

The input terminal 104 is also connected to the gate 110. The gates 106 and 110 are both connected to a gate 112. The output of the gate 112 is connected to the arm of the corresponding input-open-output lever switch 40. This switch has one fixed contact connected to the corresponding input terminal 116 of the card being tested by way of the cable 34, and it has a second fixed contact connected to a terminal 114 of the corresponding error-detector circuit, such a circuit being shown in FIGURE 5.

The paper tape reader 48 introduces the clock pulses "A" to the input terminal 100, and it introduces the corresponding programmed input "B" to the input terminal 102. The inputs "A" and "B" are processed by the gate 106 to produce the term $A \cdot B$. The terms "A" and "B" are considered to be in a true ("1") state when they are at the zero voltage level, and are regarded as being in the false ("0") state when they are at the −7 volt level. The "quiescent-state" switch 44 introduces the term "C" to the input terminal 104, this term being true (1) when the arm of the switch 44 engages the rounded contact, and this term being false (0) when the arm of that switch engages the −7 volt contact.

The inverter 108 produces the term $\overline{A}$ and the gate 110 produces the term $\overline{A} \cdot C$. The gate 112 produces an output term "P," and that term may be expressed by the following equation:

$$P = A \cdot B + \overline{A} \cdot C \qquad (1)$$

The output term "P" is introduced to the arm of the associated input-open-output lever switch 40, and that switch may be controlled to introduce the term "P" to the corresponding input terminal of the card 26 being tested, or to the corresponding error-detector circuit of FIGURE 5.

Therefore, the paper tape reader 48 feeds clock pulses "A" and programmed input signals "B" to each of the sheffer-stroke gate input circuits, such as the circuit shown in FIGURE 3. Moreover, by the appropriate adjustment of the input-open-output lever switches 40, these circuits may be respectively switched to corresponding input terminals of the card being tested, or to corresponding ones of the error-detector circuits. In addition, selected ones of the input-open-output lever switches 40 may be left open to render the associated input circuits ineffective.

For each of the sheffer-stroke gate input circuits, the corresponding "quiescent-state" toggle switch 44 may be actuated. When that switch is closed to the grounded contact to render the term "C" true, as shown in FIGURE 4, the term "$P_1$" (FIGURE 4) will be true (1) during the false (0) state of the clock signal of curve (A). The term "$P_1$" will correspond to the state of the program signal of curve (B) during the true (1) state of the clock signal. Conversely, when the associated switch 44 is set to the −7 volt fixed contact, the term "C" becomes false, that is, $\overline{C}$ becomes true. Then the output term "$P_2$" (FIGURE 4) will be false (0) during the false (0) state of the clock signals of curve (A) and, as before, the term "$P_2$" will correspond to the program signal of curve (B) during the true (1) phase of the clock signal of curve (A).

For testing a flip-flop the (quiescent-state) switch C is set in the true (1) position, as mentioned above.

It should be reiterated that a plurality of circuits, such as the circuits shown in FIGURE 3, are mounted on the rack-and-panel assembly 36. Each of the input-open-output lever switches 40, each of the "quiescent-state" toggle switches 44, and each of the attenuator-load receptacles 46, are associated with a different and separate one of these circuits, and with a different and separate one of the error-detector circuits to be described.

It should be stressed that the input-open-output lever switches 40 enable their associated circuits, such as the circuits of FIGURE 3, in each instance to be switched either to an input terminal of the card 26 being tested, or disconnected from the card, or connected to a corresponding error-detector circuit, such as the circuit shown in FIGURE 5. An associated plug-in unit, as will be described, causes a corresponding output terminal of the card being tested to be connected to the particular error-detector circuit. In this manner, each of the input terminals of the particular card being tested will have a corresponding input circuit connected to it, and selected ones of the output terminals of the particular card being tested will have their associated error-detector circuits respectively connected to them and conditioned to perform their intended function, as will be described. Other output terminals of the card being tested may be connected to appropriate loads, by the use of plug-in load circuits, as mentioned above.

The tester equipment of the invention, is, therefore, capable of detecting errors and malfunctions, including, for example, missing components, mislocated components, incorrectly wired transistors, any short circuits, any unsoldered or cold-soldered connections revealed during the shake test, incorrect values in collector load resistors, saturated and cut-off conditions of the transistors on the logic card, and many other parameters.

As noted, each of the attenuator jacks 46 serves either to connect a load, or a short circuit, to the corresponding output terminal of the card being tested; or to connect the output terminal to one of the error-detector circuits, such as the circuit shown in FIGURE 5. Each of these error-detector circuits includes sheffer-stroke gates connected together. When a 3-terminal attenuator plug-in unit is inserted in the corresponding jack 46, the corresponding output terminal of the card being tested is connected to a sensing input terminal 120 of the corresponding error-detector circuit, such as the circuit shown in FIGURE 5. However, when a 2-terminal load plug-in unit is inserted in the particular jack, an appropriate load is placed between the output terminal of the card being tested and ground, and no connection is made to the corresponding error-detector circuit.

The above described controls, as mentioned previously, permit the particular logic card being tested to have appropriate loads connected to certain output terminals, and to have other output terminals connected to respective ones of the error-detector circuits. Moreover, the controls discussed previously permit programmed inputs to be introduced to selected ones of the input terminals of the card, or to permit the programmed inputs to be introduced to the respective error-detector circuits for comparison with the outputs from the card. The card being tested may, therefore, be placed in a simulated condition corresponding to the actual operating condition to which that particular card is to be put, and the card is tested while under such simulated operating conditions and while undergoing a violent shaking action.

The error-detector circuit of FIGURE 5 includes an inverter 122, a sheffer-stroke gate 124, an inverter 126, and a gate 128. The sensing input terminal 120 is connected to the inverter 122 and to the gate 124 to introduce thereto the outputs from the corresponding output terminal of the card being tested. The input terminal 114 is connected to the inverter 126 and to the gate 128 to introduce to the latter networks the term "P" from the corresponding input circuit, such as the input circuit of FIGURE 3. The inverter 122 is connected to the gate 128 to introduce the term $\overline{S}$ to the gate 128, and the inverter 126 is connected to the gate 124 to introduce the term S to the latter gate. The gate 124 produces the term $\overline{P} \cdot S$; at its output terminal, and the gate 128 produces the term $P \cdot \overline{S}$ at its output terminal. These terms are both introduced to the false (0) input of a flip-flop 130. A reset pulse is introduced to the true (1) input terminal of that flip-flop from an appropriate reset circuit.

The true (1) output terminal of the flip-flop 130 is connected to gate 132 and to the cathode of an isolating diode 134. The anode of the diode 134 is connected to a gate 136. The output of the gate 132 is connected to the circuit associated with the corresponding error-indicating lamp 42. The output of the gate 136 is connected to an appropriate inhibitor circuit 138. The circuit of the corresponding error indicating lamp 42 connected to the gate 132 causes that lamp to be energized whenever the gate 132 produces a true output term. Likewise, the inhibitor circuit 138 is coupled to the tape reader and causes the tape reader 48 to stop immediately whenever the gate 136 produces a true output term.

The terms introduced to the false input terminal of the flip-flop 130 cause that flip-flop to be triggered false whenever there is a difference between the output "S" from the corresponding terminal of the card being tested, as read from the corresponding sensing input terminal 120, and the input "P" derived from the corresponding input circuit, such as the circuit of FIGURE 3. Such a difference causes the flip-flop 130 to be triggered false so that a true term appears at the output terminal of the gate 132 and a true term appears at the output terminal of the gate 136. A true term at the output terminal of the gate 132 causes the corresponding error lamp 42 to be illuminated, and a true term at the output terminal of the gate 136 causes the inhibitor circuit 138 immediately to stop the tape reader 48. Therefore, the operator can determine which frame of the programmed input tape 50 caused the particular error lamp to be energized. From this information, the particular portion of the circuit being tested on the logic card which is malfunctioning, can be determined.

The fragmentary circuit diagram of FIGURE 6 illustrates merely the manner in which a first plug-in load unit 150 may be inserted in one set of jacks 46 to provide an output load for a particular output terminal 152 of the card 26 being tested. The plug-in unit may provide a short circuited output, as noted above, for testing transistor saturated conditions, for example. This plug-in load unit does not serve to connect the corresponding output terminal to the associated error detector circuit.

The representation of FIGURE 36 also shows a plug-in attenuator unit 154 associated with a second group of jacks 46. This latter plug-in unit causes an output terminal 156 of the card being tested to introduce an attenuated output signal to its associated error-detector circuit, as described in conjunction with FIGURE 5.

Figure 7:
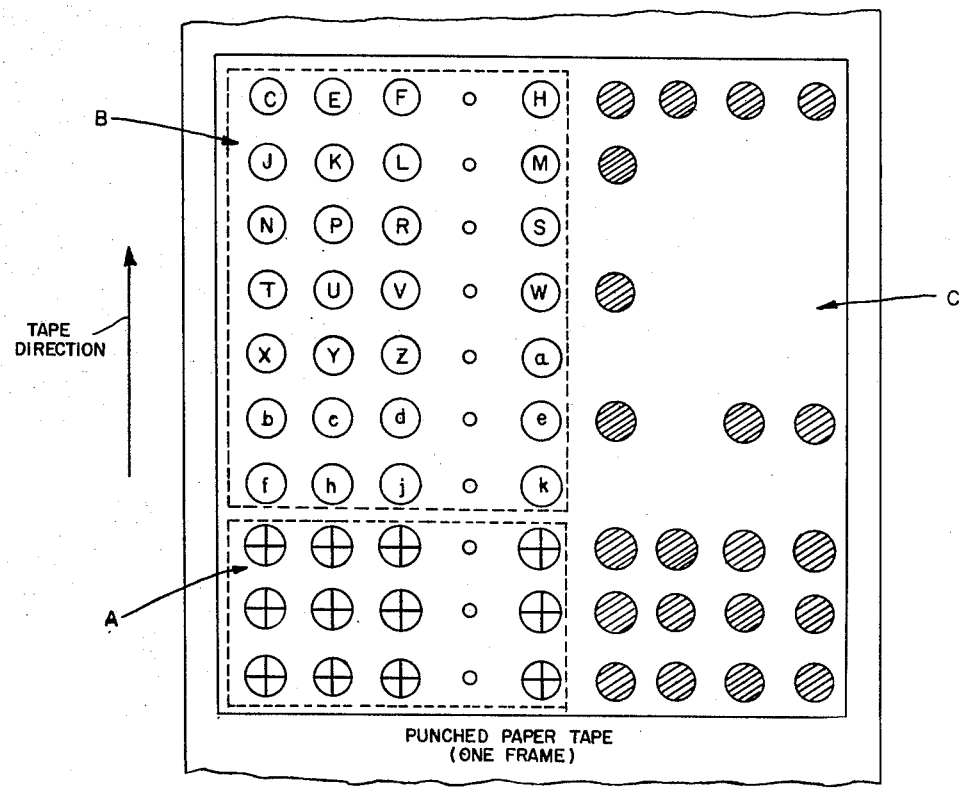
FIGURE 7 is a schematic representation of a typical frame of the punched paper tape used in the practice of the invention.

A typical frame on the punched paper tape is represented in FIGURE 7. This frame includes a first group of holes "A" which are required to produce the clock pulse input, a second group of holes "B" which are required to produce the logic program, and a third group of holes "C" which are required to ground the drum of the tape reader. It will be appreciated that the paper tape reader 48 includes, for example, 28 brushes which are adapted to engage the tape. These 28 brushes may be programmed by reference to the letters indicated in the group of holes "B" in FIGURE 7. When a hole is provided adjacent to the group of letters "B," as indicated in FIGURE 7, the corresponding reading brush is caused to be grounded. Each of the different reading brushes is connected to the terminal of a different one of the input circuits, all of which are comparable to the input terminal 102 in FIGURE 3. The paper tape reader also includes an additional group of brushes, and each frame on the tape has the group of holes "A" so that all these brushes are established at ground. The brushes of the latter group are respectively connected to a different ones of the input circuits, all of which are comparable to the input terminal 100 of the input circuit of FIGURE 3, to provide the "A" clock pulses to those circuits.

The invention provides, therefore, an improved testing system for testing circuit boards, such as logic cards, or the like, while under actual or extreme operating conditions and while subjecting the boards to violent shaking action. As described, the testing equipment of the invention is most advantageous because it can readily be adapted to test a wide variety of different logic cards, and because it can be adapted to provide a series of different appropriate tests to each card.

We claim:
1. Apparatus for testing the circuitry and components supported on each of a plurality of circuit boards, and the like, each of said circuit boards including a plurality of input terminals and a plurality of output terminals, said apparatus including: shake table fixture means for supporting a circuit board to be tested, means mechanically coupled to the shake table fixture for imparting motion thereto so as to subject the circuit board supported thereby to a moving action, a plurality of input test networks for imparting input signals to the circuitry of the circuit board supported on said shake table fixture, tape reader means coupled to said input test networks for introducing a particular pattern of input test signals to said input test networks, a plurality of error-detector test networks for receiving output signals from the circuitry of the circuit board supported on said shake table fixture and for comparing the same with particular input test signals from selected ones of said input test networks, a plurality of indicator means coupled to respective ones of said error-detector test networks for indicating malfunctions in the circuitry and components of the circuit board supported on said shake table fixture, electrical cable means connected to the input and output terminals of the circuit board supported on the shake table fixture, and a plurality of switching means connected to respective ones of said input test networks and to respective ones of said output test networks and to said cable means, each of said switching means having a first position in which one of said input test networks is connected by way of said cable means to one of said input terminals, and each of said switching means having a second position in which one of said input test networks is connected to one of said error-detector networks.

2. Apparatus for testing circuitry and components supported on each of a multiplicity of circuit boards, and the like, including: a shake table fixture for supporting a circuit board to be tested, means coupled to the shake table fixture for imparting motion thereto, so as to subject the circuit board supported thereby to a moving action, input test network means for introducing input signals to the circuitry of the circuit board supported on said shake table fixture, record reading and signal reproducing means for reading a record of particular input test signals for the circuit board supported on said shake table fixture and for deriving a pattern of input test signals from said record and being coupled to the input test network means for introducing the pattern of input signals to said input test network means, error-detector network means for receiving output signals from the circuitry of the circuit board supported on said shake table fixture and for comparing the same with particular input test signals from input test network means, indicator means coupled to said error detector circuit means for indicating malfunctions in the circuitry and components of the circuit board supported on said shake table fixture, and means including electrical cable means for connecting the circuitry on the circuit board supported on said shake table fixture to said input test network means and to said error detector network means.

3. Apparatus for testing the circuitry and components supported on each of a plurality of circuit boards, and the like, including: a shake table fixture for supporting a circuit board to be tested, means coupled to the shake table fixture for imparting reciprocal motion thereto so as to subject the circuit board supported thereby to a shaking action, input test network means, error-detector network means, switching means coupled to said input test network means and to said error-detector means for selectively connecting the input test network means to the circuitry of the circuit board supported on said shake table fixture and to said error-detector network means, record reading and signal reproducing means for reading a record of particular input test signals for the circuit board supported on said shake table fixture and for deriving successive patterns of input test signals from said record and being coupled to said input test network means for introducing the patterns of input signals to said input test network means, indicator means coupled to said error-detector circuit means for indicating malfunctions in the circuitry and components of the circuit board supported on said shake table fixture, and means including electrical cable means for connecting the circuitry on the circuit board supported on said shake table fixture to said input test network means and to said error-detector network means.

4. Apparatus for testing the circuitry and components supported on each of a plurality of circuit boards, and the like, including: a shake table fixture for supporting a circuit board to be tested, means coupled to the shake table fixture for imparting motion thereto so as to subject the circuit board supported thereby to a shaking action, input test network means, error-detector network means, switching means coupled to said input test network means and to said error-detector means for selectively connecting the input test network means to the circuitry of the circuit board supported on said shake table fixture and to said error detector network means, record reading and signal reproducing means for reading a record of particular input test signals for the circuit board supported on said shake table fixture and for deriving successive patterns of input test signals from said record and being coupled to said input test network means for introducing the patterns of input signals to said input test network means, indicator means coupled to said error-detector circuit means for indicating malfunctions in the circuitry and components of the circuit board supported on said shake table fixture to said input test network means, and means including said cable means and further including plug-in attenuator means for connecting the circuitry on the circuit board supported on said shake table fixture to said error-detector network means.

5. The combination defined in claim 3 and which includes switching means coupled to said input test network means for controlling the configuration of the input test signals passed by said input test network means.

6. Apparatus for testing the circuitry and components supported on each of a plurality of circuit boards, and the like, including: a shake table fixture for supporting a circuit board to be tested, means coupled to the shake table fixture for imparting motion thereto so as to subject the circuit board supported thereby to a shaking action, a plurality of input test networks, a plurality of error-detector networks corresponding in number to said input test networks, a plurality of switches corresponding in number to said input test networks coupled to respective ones of said input test networks and to respective ones of said error-detector networks for selectively connecting first selected ones of the input test networks to the circuitry of the circuit board supported on said shake table fixture and other selected ones of the input test networks to corresponding ones of said error-detector networks, record reading and signal reproducing means for reading a record of particular input test signals for the circuit board supported on said shake table fixture and for deriving successive patterns of input test signals from said record and coupled to said input test networks for introducing the patterns of input signals to said input test network, and a plurality of indicator lamps connected to respective ones of said error detector networks for indicating malfunctions in the circuitry and components of the circuit board supported on said shake table fixture, means including electrical cable means coupled to said switches and to the circuit board supported on said shake table fixture for introducing signals from said selected ones of said test networks to the circuitry on such circuit board, and means including said electrical cable means for introducing signals from the circuitry on such circuit board to corresponding ones of said error-detector networks.

7. Apparatus for testing the circuitry and components supported on each of a plurality of circuit boards, and the like, including: a shake table fixture for supporting a circuit board to be tested, means coupled to the shake table fixture for imparting motion thereto so as to subject the circuit board supported thereby to a shaking action, a plurality of input test networks, a plurality of error-detector networks corresponding in number to said input test networks, a plurality of switches corresponding in number to said input test networks coupled to respective ones of said input test networks and to respective ones of said error-detector networks for selectively connecting selected ones of the input test networks to the circuitry of the circuit board supported on said shake table fixture and for connecting selected ones of the input test networks to corresponding ones of said error-detector networks, record reading and signal reproducing means for reading a record of particular input test signals for the circuit board supported on said shake table fixture and for deriving successive patterns of input test signals from said record and being coupled to said input test networks for introducing the patterns of input signals to said input test network, a plurality of indicator lamps connected to respective ones of said error detector networks for indicating malfunctions in the circuitry and components of the circuit board supported on said shake table fixture, means including electrical cable means coupled to said switches and to the circuit board supported on said shake table fixture for introducing signals from said selected ones of said test networks to the circuitry on such circuit board, a plurality of jack receptacles corresponding in number to said error-detector networks connected to respective ones of said error-detector networks and adapted to selectively receive plug-in attenuator units for said error-detector networks, and means including said electrical cable means for introducing signals from the circuitry on such circuit board to respective ones of said jack receptacles.

References Cited in the file of this patent
UNITED STATES PATENTS

| | | |
|---|---|---|
| 2,487,599 | Schell | Nov. 8, 1949 |
| 2,685,671 | Grimes | Aug. 3, 1954 |
| 2,730,674 | Grimes | Jan. 10, 1956 |
| 2,776,405 | Moore et al. | Jan. 1, 1957 |
| 2,920,818 | Taylor et al. | Jan. 12, 1960 |
| 2,950,437 | Stahl | Aug. 23, 1960 |
| 2,974,275 | Haviland | Mar. 7, 1961 |
| 3,034,051 | Higgins | May 8, 1962 |
| 3,045,476 | Bell | July 24, 1962 |

OTHER REFERENCES

Flat Vibration Generator for Microphonic Investigations, Technical Report #TR-102, August 30, 1954, Diamond Ordnance Fuze Laboratories, Washington 25, D.C., pages 1-50.